INVENTORS
R. B. JOHNSON
O. F. MONEAGLE
T. D. KORANYE
H. A. JURGENS &
M. P. PRATER
BY
J. W. Armbruster
ATTORNEY INVENTORS
REYNOLD B. JOHNSON
OTTO F. MONEAGLE
THEODORE D. KORANYE
HENRY A. JURGENS &
MERLE P. PRATER
BY
J.W. Armbruster
ATTORNEY

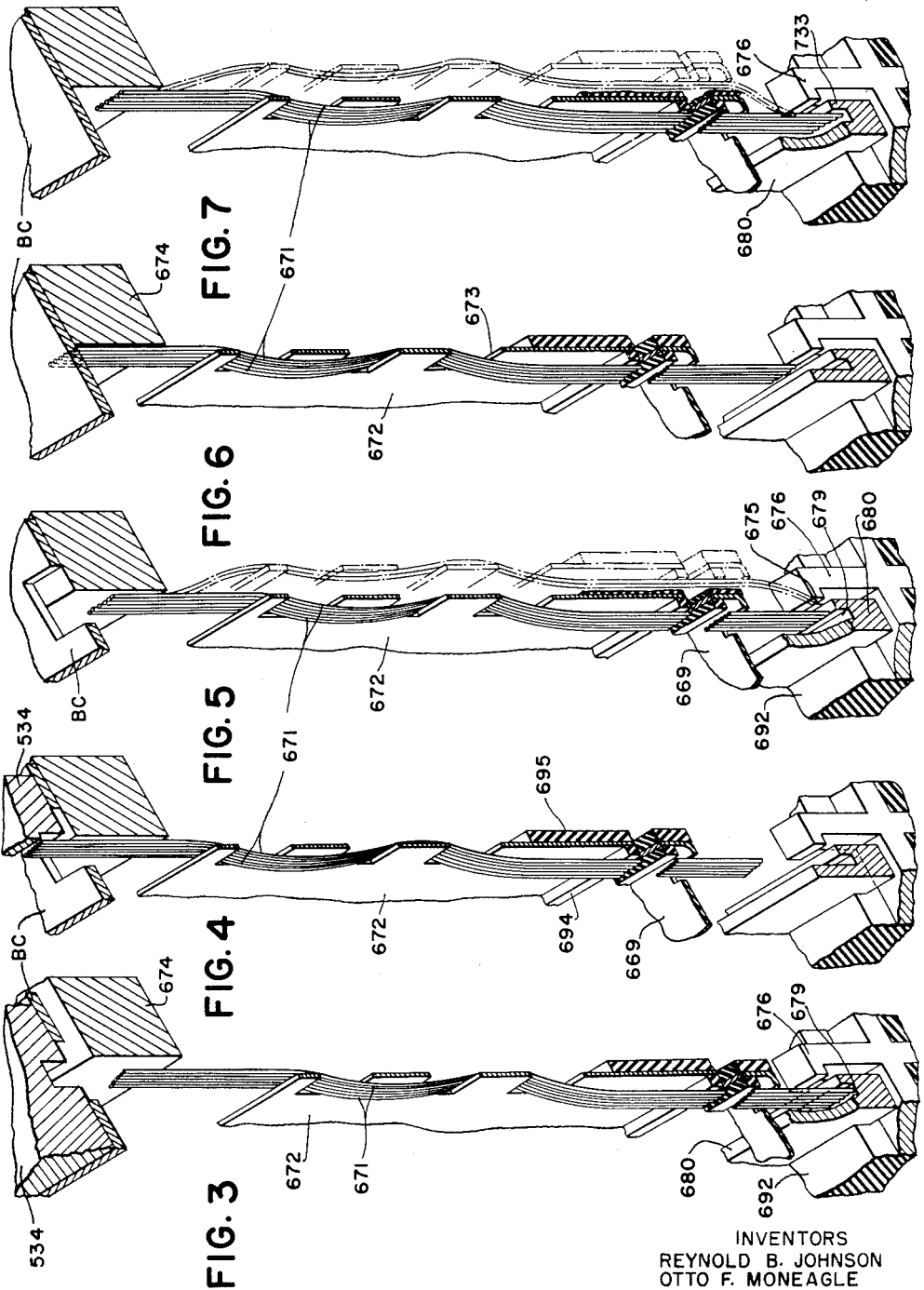

INVENTORS
REYNOLD B. JOHNSON
OTTO F. MONEAGLE
THEODORE D. KORANYE
HENRY A. JURGENS &
MERLE P. PRATER
BY J.W. Armbruster
ATTORNEY

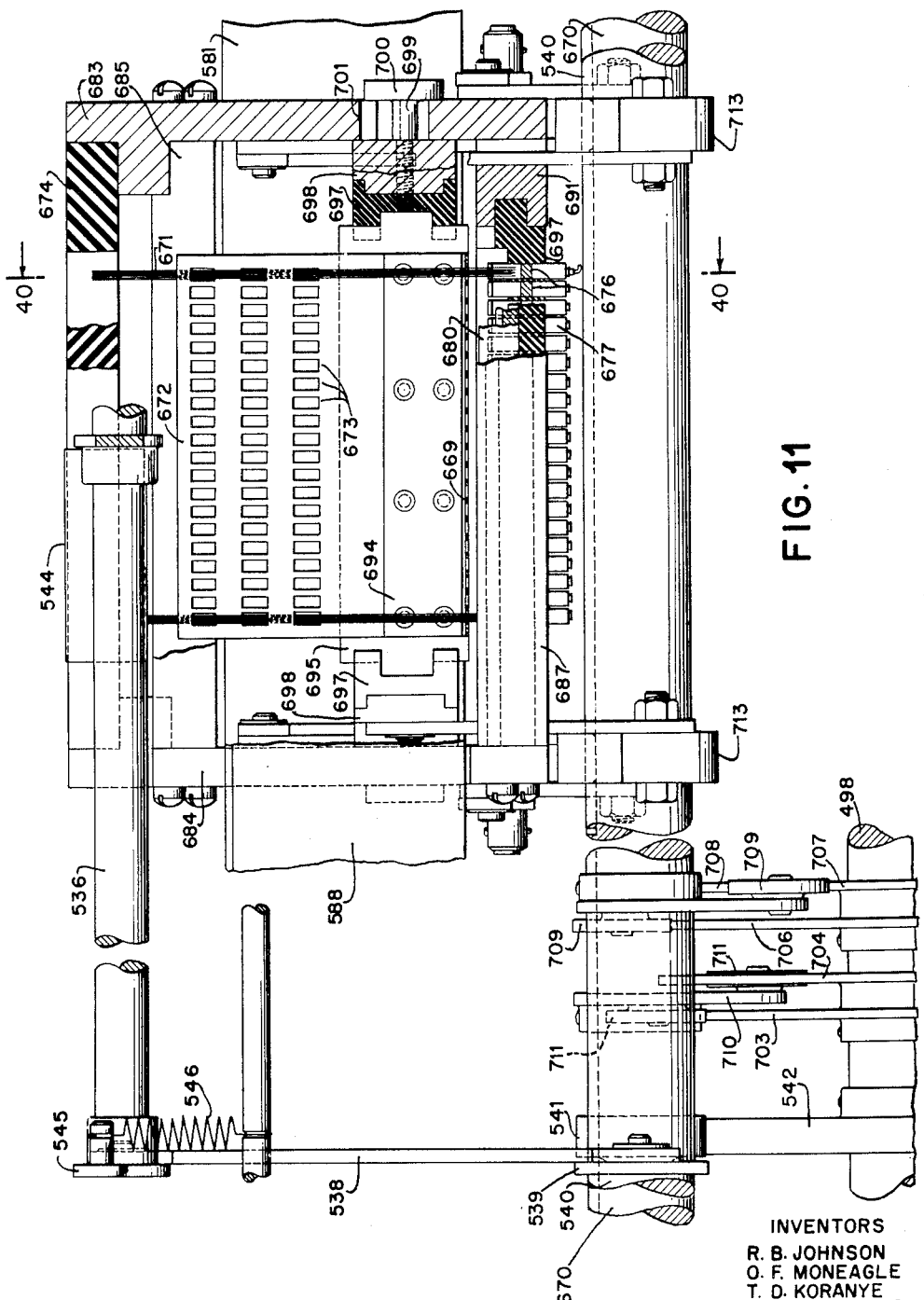

United States Patent Office

2,983,445
Patented May 9, 1961

2,983,445

RECORD SENSING DEVICES

Reynold B. Johnson, Palo Alto, Calif., and Otto F. Moneagle, Endicott, Theodore D. Koranye, Vestal, Henry A. Jurgens, Briarcliff Manor, and Merle P. Prater, Vestal, N.Y., assignors to International Business Machines Corporation, New York, N.Y., a corporation of New York Original application June 19, 1953, Ser. No. 362,711, now Patent No. 2,889,110, dated June 2, 1959. Divided and this application Jan. 14, 1958, Ser. No. 708,864

6 Claims. (Cl. 235—61.11)

This is a division of application Serial No. 362,711, filed June 19, 1953, now Patent 2,889,110, for Bill Feeding and Piercing Devices.

The invention relates in general to record controlled accounting devices and more particularly to an improved means for sensing data represented by perforations or index points of weakness in record sheets.

The main object of the invention is the provision of sensing devices for detecting data representations on an improved form of bill or other accounting instrument. When the bills or the stubs thereof are pierced, it is done in such a way as to leave the paper unblemished. The paper disturbed by piercing is rolled or ironed back into the plane of the paper so that the weakened index points cannot be detected by the eye. However, the sensitive sensing instrumentalities disclosed therein are adapted to penetrate such points of weakness and create electric circuits for control of various accounting functions.

Heretofore, when an accounting record contained perforations, it was marred by the broken outline of the surface which sometimes cut out or distorted parts of the printed matter. The perforation edges also became distorted when handled and bent and interfered with stacking and free feeding motion of the cards with respect to each other. In the present instance the problem is solved by piercing rather than punching the record material and then restoring the displaced record material back to its original position. In other words, the punch wires used in the present case are arranged with slanted pointed ends to cut the record material without forming a chad. In the preferred form shown, piercing is accomplished by cutting a U-shaped flap in the record material and then ironing such flaps back into the surface of the record material so that to all appearances the record is without blemish. With the record in this condition, printing may be performed all over the record instrument and to all apperances it seems like an ordinary check or bill. However, when the record is presented subsequently to sensing devices as part of a system of accounting, the weakened sections are detected by proper sensing devices just as though they were regular perforations. As an alternative of the U shaped rectangular chadless form of index point there is use of a piercing means of the shapes, and even that comprising a pointed needle which, when projected through record material, causes a circular projection on one side which when ironed back never completely closes the puncture. The remaining perforation is so small as to be unnoticed but still effective in connection with electrical card sensing devices.

A feature of the invention is the provision of a novel economical form of card sensing device including frictionally held wires which are raised into contact with the bill and those going through perforations therein are displaced so that the lower ends are raised with respect to the wires of other imperforate index points. As a result, when the wire holders are shifted transversely with the lowered wire ends against a recessed ledge, the raised wires are bowed and come into contact with electric conductors and send pulses indicative of the bill perforations.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 3 is a perspective view showing the sensing devices of one index point position in the bill feed sensing unit as the sensing wires appear in the home position.

Fig. 4 is a perspective view of a sensing mechanism with the sensing wire projected upwardly through a perforation in the ledger card.

Fig. 5 is a perspective view showing the sensing wires lowered and shifted sidewise to establish contact indicative of the sensing of a perforation or point of weakness in a card.

Fig. 6 is a perspective view showing the sensing mechanism with the sensing wires raised but encountering an imperforate area of the record card.

Fig. 7 is another perspective view showing the aftermath of the operation of Fig. 6, whereby the sensing wires are lowered and shifted, but fail to establish contact, because they are depressed relative to the wire holder by an obstruction in the form of the card imperforate area.

Fig. 11 is an end elevation view, partly in section, showing the sensing wires and associated current conducting devices of the sensing unit in the bill feeding devices.

*The machine in general*

The main purpose of this specification is to point out the controls and cooperation between a novel form of bill printing and piercing device and a tabulator. The bills are in the form of cards which are sensed, pierced and printed upon in such a fashion as to have advantages over similar instruments produced heretofore.

The magazine M (Fig. 1) holding the blank bill records BC is seen to be at the lower left portion of the cantilever extension. These bill forms BC are usually record cards similar to those used to control the tabulator. However, they are often provided with extra stub sections and also made in various sizes to become instruments in various accounting work other than that of billing; for example, check making, ledger posting or other kinds of accounting controls may also be passed through the bill feeding device and in conjunction with the tabulator receive and impart information necessary to produce a complete accounting procedure.

Returning now to the path of motion of the bill BC through the bill feed and the various units of mechanism encountered in such path, it is noted that the first station the bill enters after leaving the magazine is a sensing station S. There, any pre-punched data such as an account identification may be sensed and compared with supposedly similar account identifications on record cards TC being sensed in the tabulator at the same time. In this way, it is definitely established that the data about to be recorded and pierced in the bill properly belongs thereon.

Figure 1:
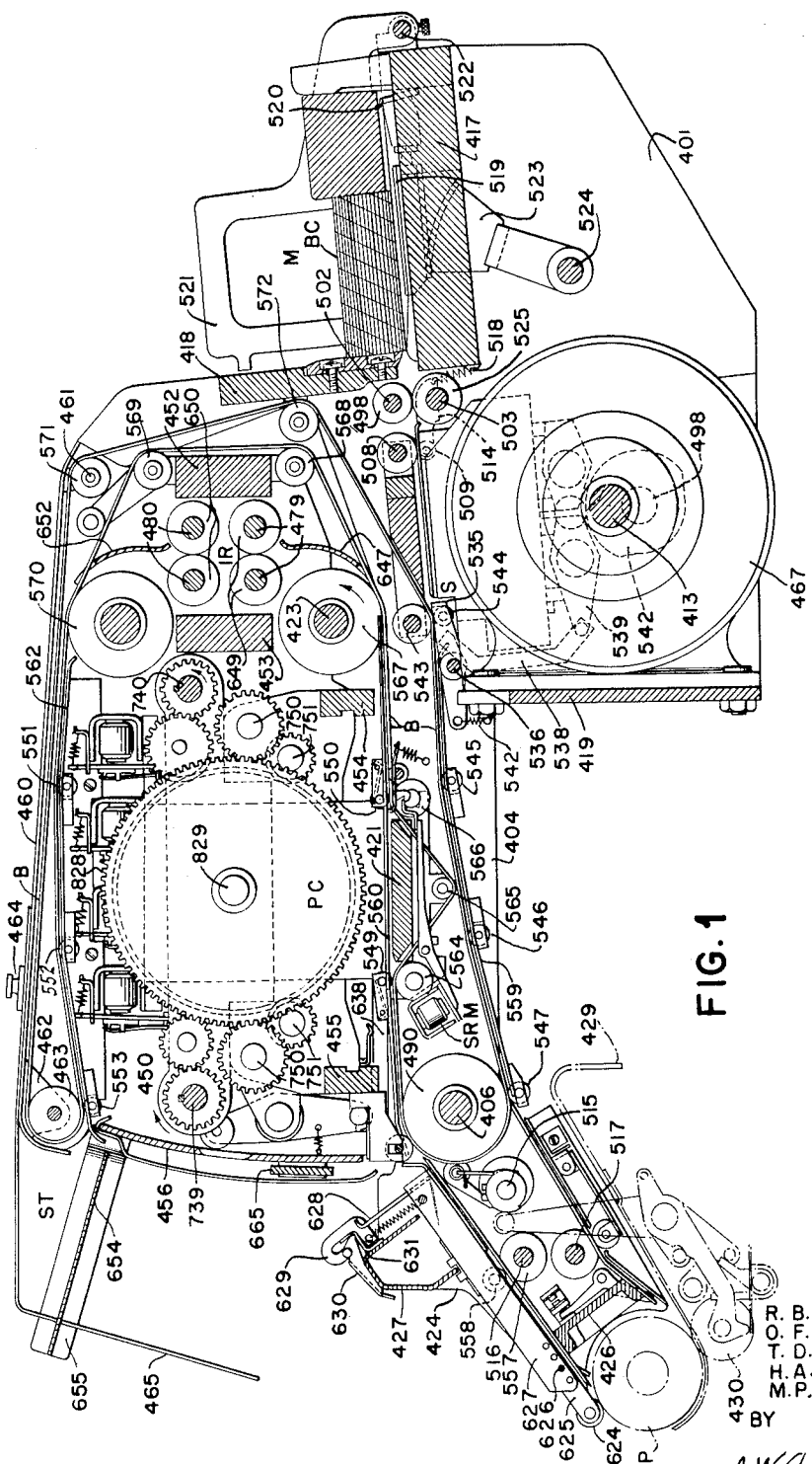
Fig. 1 is a sectional elevation view of the bill feeding devices showing a portion of the driving mechanism for the record sensing devices.

In Fig. 1, the double lines represent a conveyor belt feed for the bills to carry them from station to station. The belt is seen to describe an endless path in the shape of a U lying on its left side. The part of the belt path affecting the bill is in the shape of an S which the bill enters at the lower right side after coming out of the sensing station S.

The bill BC is carried from the sensing station S further to the left into a stopping station where it is held in readiness to be drawn around the platen when the platen has finished with a preceding bill. At the proper time, usually occasioned by total printing and ejection of the preceding bill, the bill at the stopping station is released and advanced and drawn part way around the platen P of the tabulator.

While at the platen P the bill BC is divorced of most of the controls of the bill feed and instead comes under the control of the printer, accumulator and tape feed advancing controls of the tabulator. It is only when the recording operations have been completed and the bill card is ejected from the platen that the bill feed devices again take over and carry the bill to the piercing station PC.

At the piercing station PC the bill BC is pierced to represent a variety of information in such a fashion as to prevent marring its appearance. This is done by piercing rather than punching the data in the record. At selected index points the record material is pushed out in the form of a flap. There is no chad produced. Instead the flap remains on the card and is restored back in place later in such a position as to be unnoticeable but yet have a U shaped line of weakness which is used in other machines, to either operate upon the card with the chadless index points to convert them to regular rectangular holes, or to use the chadless record to control the punching of a standard card with rectangular holes.

These chadless perforating devices at PC have another desirable constructional feature in that they are designed to set up or store received information in several fields and in different cycles before piercing in one operation. For example, the account identification may be derived from the first card passing through the tabulator and stored in the piercing unit early in a series of cycles devoted to one bill preparing operation. Later in that same series of cycles another part of the piercing mechanism may be operated to store the gross and net charge amounts for electric consumption derived from item record cards passing through the tabulator. Still later other parts of the piercing unit may be controlled from accumulators of the tabulator when they are read to take out totals indicating utility charges involving such things as merchandise bought, repairs, old balance amounts, etc. By the time the bill card reaches the piercing station and is properly situated therein, all of these parts of data relating to the bill have already been set up in the storage part of the piercing unit and then in one stroke the wire piercing needles of all sections of the piercing unit descend and pierce the data into one or more sections of the bill card and stubs.

After the piercing operation at PC, the bill card is conducted further to the right and upward through two sets of ironing rollers IR which push the extending flaps of the pierced index points back into the plane of the bill card so that to all appearances it is imperforate.

The final motion of the bill is upward and to the left and then carried into a stacker ST for holding the completed bills.

The drive mechanisms

Figures 2, 2A:
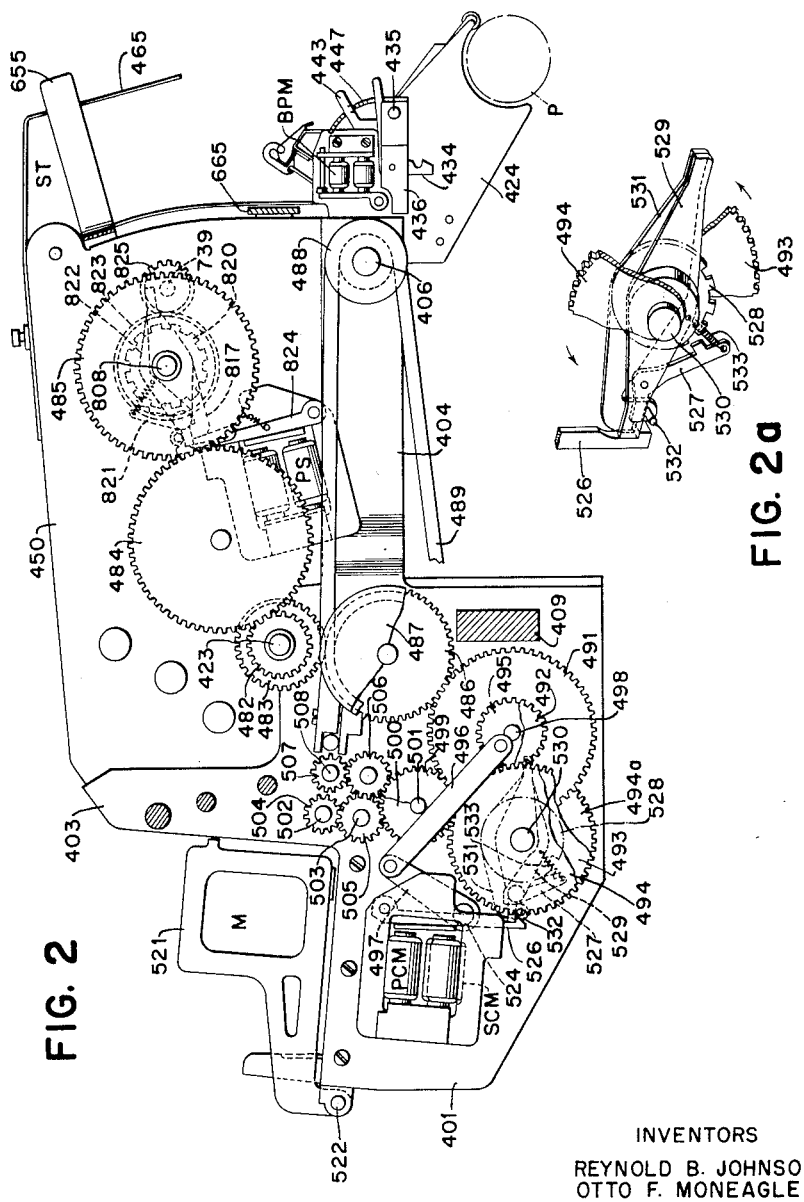
Fig. 2 is a side elevation view looking at the outside of the bill feeding device and showing some of the driving mechanism for the record sensing devices.
Fig. 2a is a detail perspective view of a part of the clutch mechanism for the driving devices.

Referring to Fig. 1, it is seen that a bill feed operating motor 467 is secured to the rear of plate 419. The shaft 413 of the motor extends outside the left main frame and there carries a pulley with a belt driving a large pulley fastened to shaft 423 (Figs. 1 and 2). Also fastened to shaft 423 is a small gear in mesh with a large gear for driving the clutch which selectively operates the piercing device to depress the pierce wires through the bill. This shaft 423 also drives gearing leading to the ironing roller shafts 479 and 480.

Drive shaft 423 extends across the entire bill feed unit and projects from the right side (Fig. 2) where it carries a pair of fixed gears 482 and 483. The former drives a large idler 484 which in turn meshes with the large clutch gear 485 of the clutch which operates parts of the piercing unit to shift the digit slides sequentially and also for depressing the offset wire bails to act in effect as the piercing set up actuator.

Gear 483 drives a gear 486 connected to a pulley 487 which drives a pulley 488 and shaft 406 by means of belt 489. In Fig. 1, it is seen that shaft 406 carries a series of pulleys 490 around which are wrapped the front ends of the six long endless belts B which carry the bill cards through the bill feed.

At the end of shaft 406 opposite the end with pulley 488 is attached a gear which drives a train of gearing for operating the feed shafts 515, 516, and 517 shown near the platen P in Fig. 1.

Gear 486 (Fig. 2) also effects other drives by causing rotation of gear 491 which is loosely mounted on shaft 498 but coupled with a pinion 492 meshing with the drive gear 493 of the picker feed clutch. When the clutch is effective, a gear 494 is driven and it in turn drives the pinion 495 which acts as a crank for the picker linkage 496 and 497. Pinion 495 is fixed to shaft 498 and drives it whenever the magazine feed operates and thus causes a sensing operation as revealed more fully hereinafter.

Gear 494 also drives a gear 500 with a connected gear 499, all of which are loosely pivoted on a stud 501. A pair of shafts 502 and 503 near the throat of magazine M carries feed rollers and also carries meshing feed pinions 504 and 505, the latter of which is driven by gear 499. Gear 499 also meshes with an idler pinion 506 for driving a pinion 507 on another feed shaft 508. In Fig. 1, it is observed that the shafts 502, 503 and 508 carry feed rollers for conducting an issued bill card beyond the magazine M.

The advance of bill cards

In Fig. 1, it is seen that the bill card magazine M has the base plate 417 for supporting a series of slides 519 with picker knives 520 for engaging the edge of the bottom card and feeding the cards singly and successively in the bill feed. A pair of side wall members 521 are adjustable along a horizontal rod 522 to confine cards of single, double, or fractional widths such as extra length bills with portions of cards as stubs. Operating sectors 523 are fastened to a shaft 524 (Fig. 2) which is at the end of the picker drive linkage 496 and 497 mentioned hereinbefore. On every revolution of gear 495, the sectors are rocked and slides 519 (Fig. 1) are reciprocated to pick off the bottom card and move it to the left between the feed rollers on shafts 502 and 503.

Picker operation is magnetic clutch controlled and dependent upon energization of clutch magnet PCM (Fig. 2) which rocks armature lever 526 and permits engagement of a pawl 527 pivoted on a double winged stop appendage of gear 494 with the notched disk 528 secured to gear 493. When so connected, the clutch provides a driving train from the gear 491 to the gear 495 acting as a crank for the linkage 496, 497 to rock shaft 524 and operate the picker.

Behind the picker clutch PCM, 527, 528 is a similar sensing unit clutch with a magnet SCM and parts duplicating the picker clutch parts, the only difference is that the clutch disk which is also fastened to gear 493 operates a clutch pawl on a gear 494a, which is in mesh with a pinion 495a behind gear 491 and fastened to shaft 498 to drive it.

In Fig. 2a, it is seen that pawl 527 is pivotally mounted on the inside of the double armed clutch connecting lever 529 which is loosely pivoted on stud 530 but attached to the driven clutch gear 494. Alongside pawl 527 and loosely pivoted on stud 530, is a pawl release lever 531 also double armed and provided with an extending pin 532 which underlies the short extension of pawl 527. A spring 533 tends to pull the pawl towards the clutch disk, but normally the pawl is held out by pin 532 because said pin is on lever 531 which along with lever 529 is held latched up by armature latch 526. When released, levers 529 and 531 are separated slightly because pawl 527 presses down on pin 532 and rocks the levers apart until at the half revolution mark when one or the other of the pairs of extending lever points are engaged by latch 526 which first engages lever 531 to rock the lever and act through pin 532 to rock the pawl disengaged, and next engages lever 529 to stop the driven parts including gear 494.

It is already noted that gear 494 drives gear 495 which is the driver of shaft 498 and also a crank for the picker feed to issue a bill card out of the magazine.

Upon emerging from the magazine M (Fig. 1) the bill card is fed into a first pair of feed rollers on shafts 502 and 503 which are driven by gears 504 and 505 (Fig. 2) as already noted as being rotated during card feeding operations. Both roller shafts are journalled in the side frames 401 and 402. The rollers on the upper shaft 502 (Fig. 1) are pressed down against the lower rollers by compression bearing springs (not shown) to maintain the two in firm engagement with the card.

Following the first set of feed rollers, there is a second set of rollers, the upper rollers being on shaft 508 which is journalled in the side frames 401 and 402, and on which are attached the roll portions which are in cooperation with the small lower feed rollers 509. As shown in Fig. 1, each roller 509 is carried on an arm 514 which has a bearing surface embracing the feed roll shaft 503. The arm 514 is urged in the direction of the upper fed roller by means of a spring 518. From these feed rollers the bill card is fed into the sensing station S, later to be separately described, and held therein until another feed cycle is signalled.

During the closing portion of the feed cycle the card enters the sensing station S and is arrested therein by a card stop 535. The card feed cycle terminates shortly thereafter with the card in position for sensing, the front edge of the card being held against the card stop and the trailing portions of the card being held between the rolls 508 and 509. The sensing cycle is then initiated and towards the closing portion thereof, the card stop 535 is retracted below the card line to allow pasage of the card which will be moved by the rolls 508 and 509 upon initiation of the immediate next card feed cycle. After leaving the sensing station, the card is fed into the carrier system which conveys the card to the bill positioning station located just short of reaching the carrier platen P.

The card stop mechanism at the sensing station S includes the stop bail 535 (Figs. 1 and 9) which has side arms encircling the shaft 536 and an extension to which is attached a spring 537. To another extension of bail 535 there is articulated the upper end of a link 538 which at its lower end is pivotally connected to a cam follower lever 539 loosely mounted on shaft 540. At the opposite end of lever 539 is a roller 541 which rests on the cam 542 rotated by shaft 498 and shaped to raise the roller at the end of each card sensing operation so that lever 539 is rocked counterclockwise and link 538 and bail 535 are lowered to allow the card to move to the left.

Directly behind the card stop 535 are the pair of feed rollers 543 and 544, the former being one of a series of such rollers for guiding the belts B, and the latter pressing against the belt as held by a lever 545 loosely pivoted on shaft 536 and urged upward by a spring 546. When the stop 535 is withdrawn, the rollers 508 and 509 become effective again to move the card slightly to the left where its front edge is caught between the constantly moving belts B and cooperating rollers 544 to move the card toward the platen.

Referring to Fig. 1, it is noted that the belt carrier system comprises a series of six endless belts B in cooperation with feed and guide rollers. As shown in Fig. 1, these endless belts cooperate with rollers numbered from 544 to 553, inclusive, which merely rest on the belts to advance the cards. Of these nine sets of rollers, the first three sets 544–547 are pivoted in blocks secured to the underside of a guide plate 559 attached beween forward frame extension 404 in a position to press the rollers upward against the underside of belts B. A somewhat similar guide plate 560 is attached to the lower edges of the upper section frames 450 and 451 and serves to guide cards through the piercing unit. Guide plate 560 is slotted to allow rollers 548, which are loosely mounted in blocks 561, to descend into contact with belts B. It is also slotted to permit sliding action of rollers 549 for selective feeding of a card out of the piercing unit as explained hereinafter. Feed rollers 550 are on blocks secured to the top of guide plate 560. The other three sets of feed rollers 551–553 are pivotally mounted in blocks secured to the underside of a guide plate 562 fastened between the tops of the upper section frames 450 and 451 and situated so as to press the rollers against the underside of the stacking loops of the belts B.

As noted hereinbefore, the belts B are driven by gear and pulley connections to shaft 406 as seen in Fig. 2. The drive wheels 490 (Fig. 1) on shaft 406 are only one set of a series of sets of wheels or pulleys around which the belts B are drawn to conduct the cards along the bill feed path. Such guide wheels include 543, 490, 564–570, 463, 571 and 572 in order of appearance from the exit end of the sensing unit S and back there again.

The several preceding sections of this specification deal with the advance of the bill card from the magazine to the stacker. During such an advance the card is stopped twice, first at the sensing station S (Fig. 1) and second at the piercing station PC. Now it is proposed to set forth in detail the mechanism and controls for sensing the card.

The bill card sensing devices

Figure 8:
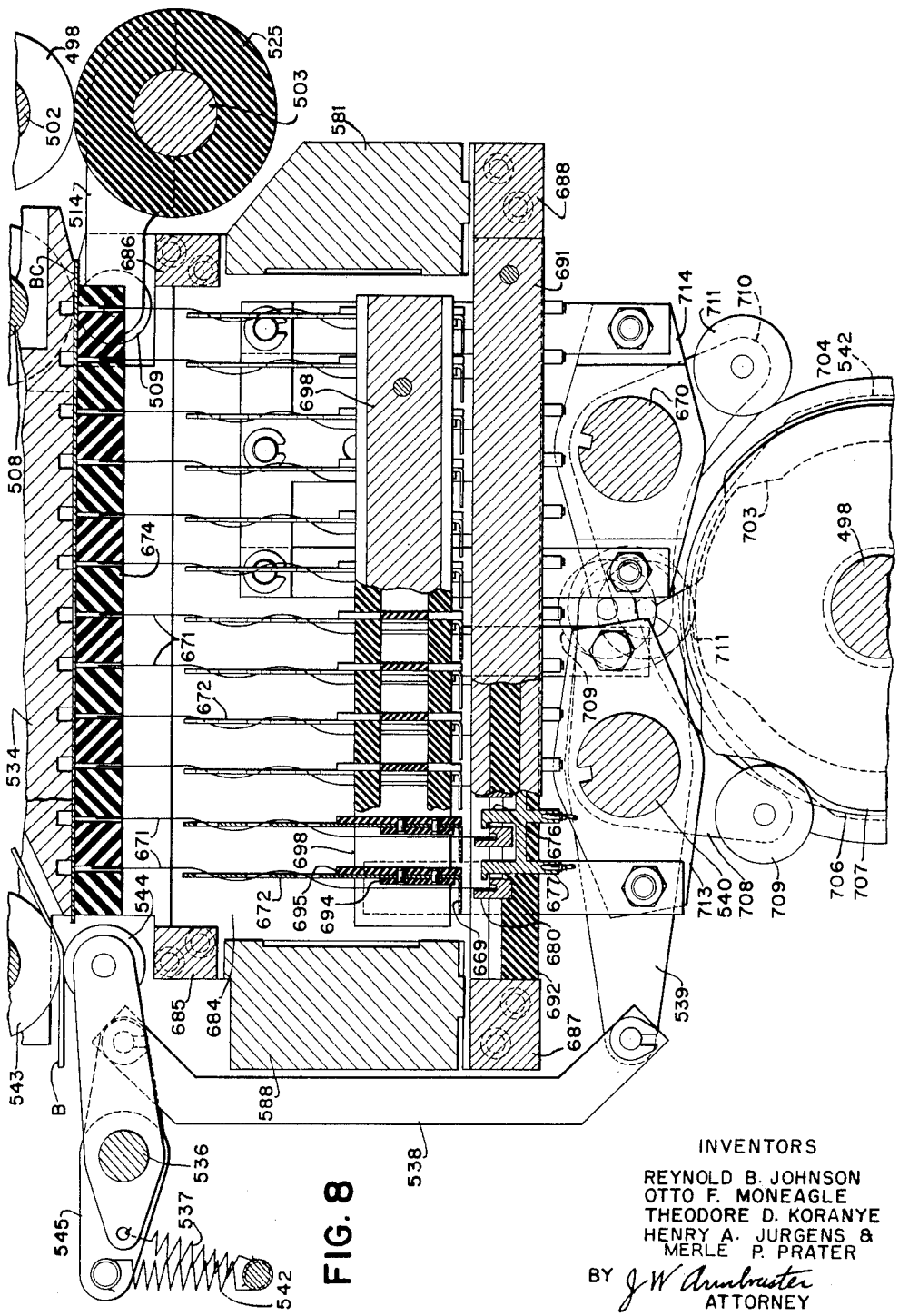
Fig. 8 is a sectional elevation view taken through the sensing mechanism in the bill feeding device.

When a bill card is brought forward out of the magazine M and held at rest against the stop 535 (Fig. 1), it is in position to be sensed and at that time all of the perforated index point positions of the bill are over the upper ends of a series of groups of wires 671 (Fig. 8). In Fig. 8 the sensing wires appear as only twelve spaced vertical wires, one for each of the usual twelve columnar index points of the IBM card perforating code. However, when viewed perspectively or from the end as seen in Figs. 3–7 and 11, it is apparent that several wires 671 are assembled side by side as one set or group for each card index point. The upper ends of a set of wires 671 (Fig. 5) are directly under a related card perforation position and they are arranged in a line across the narrow width of the rectangular perforation. Usually alignment is good enough so that all wires of a set protrude through a perforation; however, sensing by fewer wires is sufficient. Should any other size, kind, or shape of index point card treatment be used, the wire set would be equally effective in sensing because upward movement through the card by any one wire of a set is just as effective as displacement of all.

There is provided a slotted vertical holder 672 (Fig. 11) for the wire sets of each row. Across each holder there is arranged a series of vertically aligned columnar openings 673 for receiving all the sensing wires 671 which cooperate with one digital row of card index points. The horizontal spacing of the openings 673 corresponds to the columnar spacing of the perforation columns of the card. Three vertically aligned and spaced openings 673 are provided for each set of sensing wires 671 which are threaded through the openings as shown in Figs. 3–7 so that they are flexed and, in tending to straighten, they bear against the walls of the holder 672 and are frictionally and flexibly held thereon.

The sets of wires 671 are supported in the vertical position and frictionally held perpendicular to the horizontal card sensing channel or slot which is between the notched upper guide bar 534 (Fig. 8) and the slotted lower channel bed plate 674. The vertical slots in plate 674 serve to confine and guide the upper ends of the wire sets to the index point positions. When the bill card BC appears horizontally between bars 534 and 674, its front end abuts against stop 535 (Fig. 1) and it is held there momentarily for static sensing by the wires. After the wire holders are lowered, the card is free to be advanced because the analysis thereof is stored in the setting of the wires on the holders. As illustrated in Fig. 11, only twenty orders or columns are shown as sufficient for group number or account number comparisons, but the same construction is applicable for the full width of the card.

Figure 9:
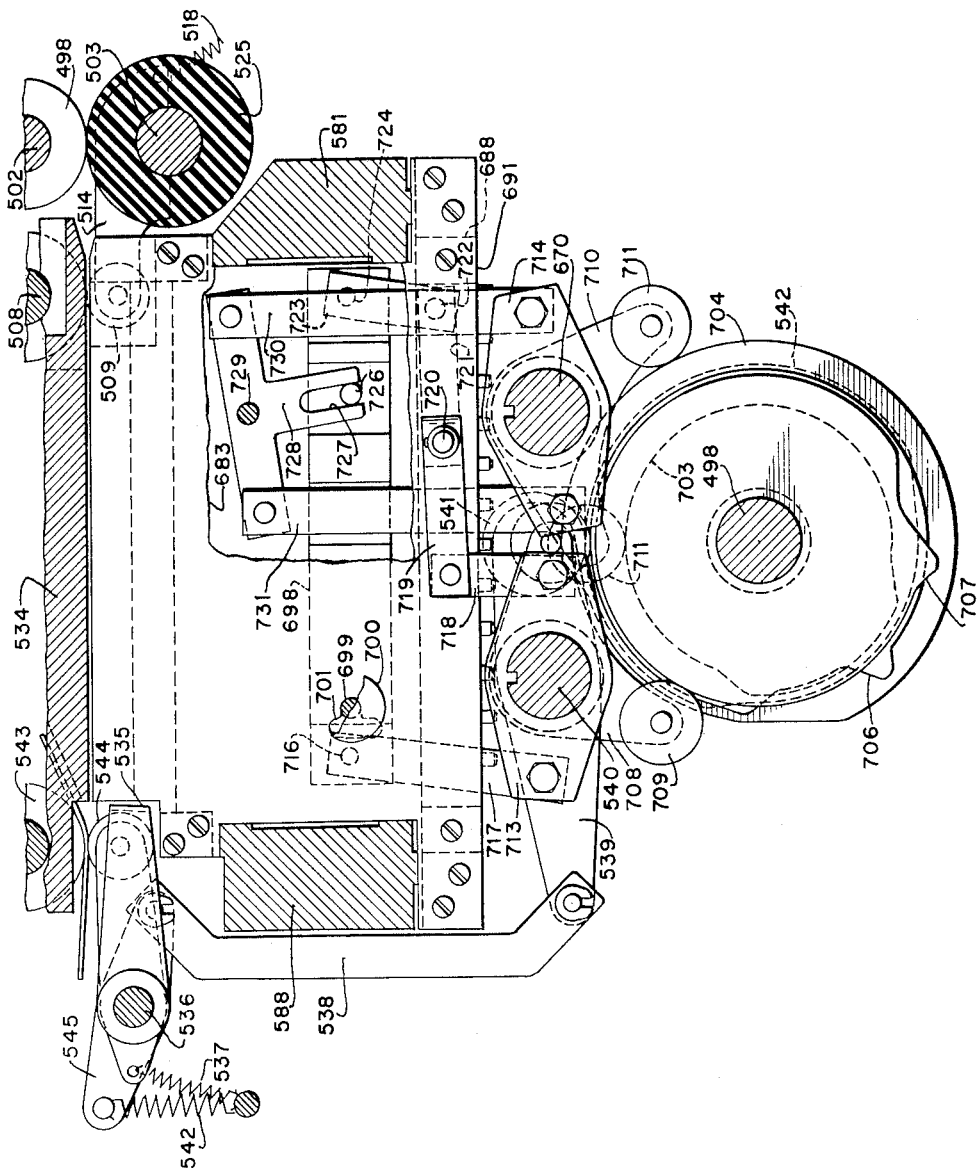
Fig. 9 is a side elevation view of the sensing mechanism showing the operating devices for shifting the sensing wires.

Figs. 8 and 11 show the parts in the last quarter of an operating cycle when a card is about to be sensed, but Fig. 9 is shown with the parts in a normal position.

The card perforations are sensed by lifting all sets of wires and abutting the upper ends against the lower face of the card. At all imperforate index points the wire ends are obstructed and shifted downward with respect to the other wire sets which are permitted to rise vertically unobstructed through the card perforations and maintain a high position on the holder. After the holders are lowered with the displaced wires, the holders are shifted horizontally as illustrated in dotted lines, Fig. 5, whereupon the bottom portions of those wires with raised ends are brought against a top shoulder 675 on a denominational contact bar 676 for completing electrical connections for a card sensing circuit between the wire holder 672 and the bar 676 which has pluggable outlets 677 (Fig. 8). The circuit is shown and disclosed in copending patent application Serial No. 362,711 now Patent No. 2,889,110. In the case of those wires 671 which were not permitted to rise through card perforations, they are forced downward relative to the rising holder 672 and then later, when the holder is lowered, such wires have their lower ends so positioned and depressed as to fit into a notch 679 of a fixed digital retainer bar 680 and be prevented (Fig. 7) from going to the right when holder 672 is so shifted, and thereby fail to touch bar 676. Accordingly, no circuit is established by depressed wires, which is as it should be, because they represent imperforate card positions. Figs. 3, 4 and 5 show successively the raising, lowering and horizontal shifting of a set of wires in sensing a perforation to establish a circuit. Figs. 6 and 7 show the wire positioning attending the abutment of a card imperforate position and holding of the lower wire ends to prevent contact closure with a resulting lack of circuit connections.

The framework of the sensing unit is shown quite well in the views Fig. 8 and Fig. 11, which appear as sectional views. The main portion of the sensing mechanism is supported between two main cross bars 581 and 588 which extend across the machine between two main side frames. A pair of sensing unit side frames 683 and 684 are shaped to be keyed on to the cross bars 581 and 588 and affixed thereto in a selected position to underlie a predetermined field of the card when it is in the sensing position. The sensing unit side frames are spaced apart by a series of cross bars 685–688 which extend across the unit near or at the four corners thereof. The upper inside portions of the side frames 683 and 684 are formed with shoulders to receive the insulation plate 674 which is mentioned hereinbefore as the part which is slotted to guide the upper ends of the sensing wires 671. Fastened across the lower part of the sensing unit is an insulation base or contact bar holder formed with an interior insulation plate 697 (Fig. 11) and a pair of outer U shaped rails 691 which are fastened to the side frames 683 and 684 to hold the contact and retaining bars 676 and 680 suspended in such positions as to cooperate with the lower ends of the sensing wires. The way that the contact and retaining bars are embedded in and separated from each other in the insulation 692 is best shown in the sectional views.

From the foregoing, it may be observed that the outer frame of the sensing unit is a sort of immovable boxlike structure with the top portion giving guidance to the upper ends of the sensing wires for cooperation with a card and the lower portion having pluggable contact bars with which the lower wire ends cooperate to selectively establish contact when related perforations are sensed. Within this outer immovable frame is an inner oscillating and reciprocating structure for carrying the sensing wires and for giving them the vertical sensing movement and horizontal contact establishing movement referred to hereinbefore. Attention may now be directed to this inner movable framework for holding the wire holders.

Figure 10:
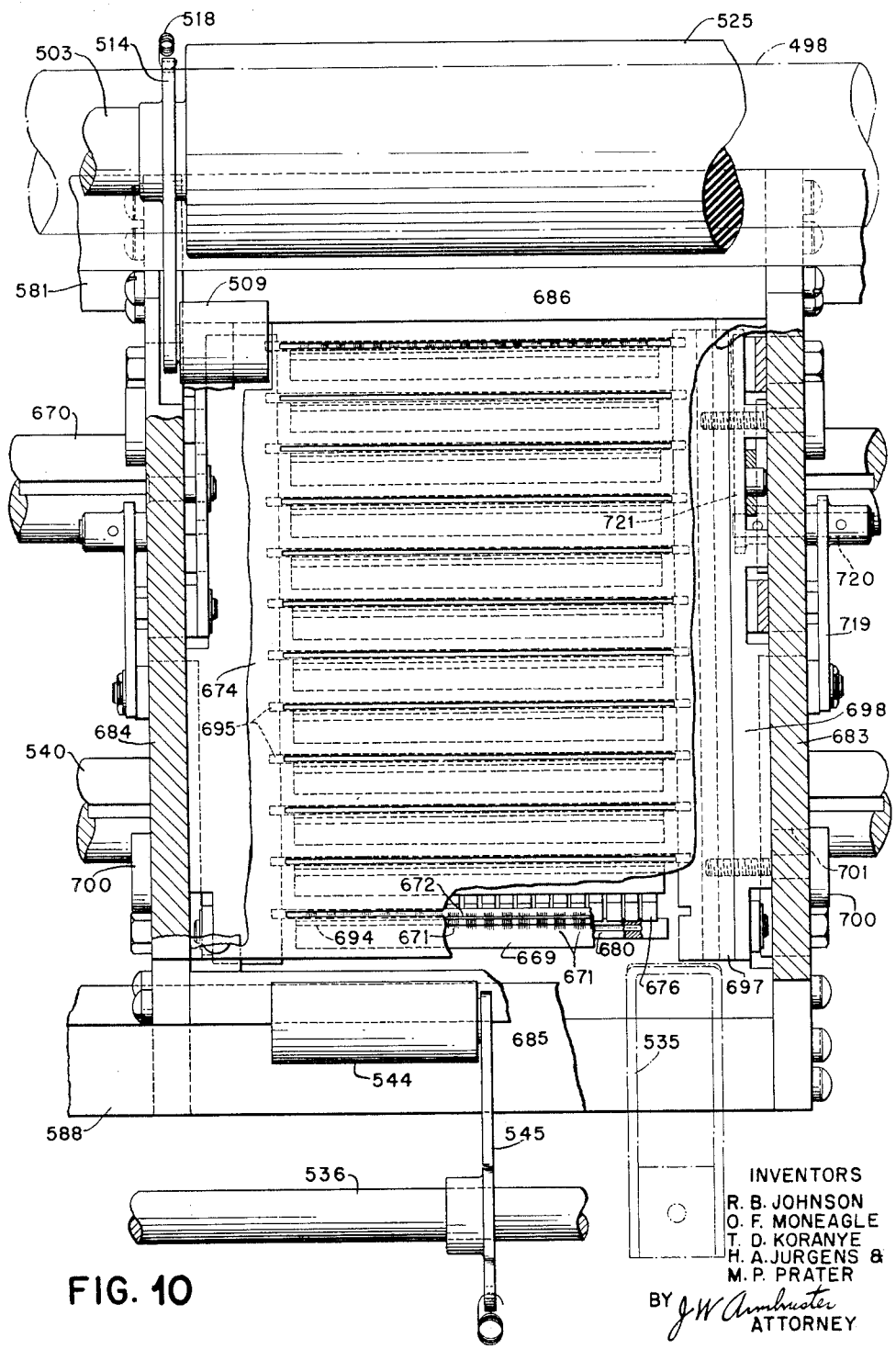
Fig. 10 is a plan view of the sensing machanism in the bill feeding devices.

Referring to Figs. 10 and 11, it is noted that the twelve thin plates or wire holders 672 are provided with sheets of insulation 694 and 695 which are also shown in Fig. 8 as riveted on opposite sides of the plate 672 for purposes of insulating the wire holder from the frame of the machine. The lower end of the wire holder 672 is formed with a flange 669 which not only strengthens the holder but also provides openings for guiding and confining the lower ends of the sensing wires 671.

Turning back to Figs. 10 and 11, it is noted that the insulation sheet 695 extends beyond both sides of the wire holder, and it is by means of these extending insulation ends that the several wire holders are secured to insulation bars 697 which are in turn secured to side rails 698 confined by the inner faces of the sensing unit side frames 683 and 684. The inwardly facing sides of insulation bars 697 are formed with notches and a centralized horizontal slot for receiving and confining the ends of the insulation plate 695, and in this way the bar not only separates the sensing mechanism electrically from the metallic framework of the machine but it also spaces the wire holders regularly to cooperate with regularly spaced digital perforation positions of the bill card BC. The side rails 698 and all the parts contained therebetween, including the insulation bars 697 and the several wire holders 672 and all the parts thereon, form a unit which is reciprocated vertically and horizontally between the sensing unit side frames. In order to guide this interior movable frame it is provided on each side with a pair of extending studs 699 which are formed with inwardly projected threaded portions for fastening together the side rails 698 and the insulation bar 697, and extending therefrom is a shouldered portion which is slightly larger than the thickness of the sensing unit side frames. On the outside of the side frames, each stud 699 is formed with an enlarged head 700 which confines the movable frame for reciprocation within the side frames.

Reference to Fig. 9 reveals that shouldered portions of the four studs 699 project through T shaped slots 701 formed in pairs in the two side frames for limiting and guiding the movement of the inner frame for the vertical and horizontal movements mentioned hereinbefore.

Linkages are attached to the side rails 698 (Fig. 11) and it is through positive main and return cams 703, 704 and 706, 707 on driving shaft 498 that the sensing unit frame is reciprocated horizontally and vertically by means about to be described.

For the purpose of imparting vertical movement there is provided a bell crank 708 (Figs. 9 and 11) keyed to shaft 540 and carrying two cam follower rollers 709 resting on cams 706 and 707, said cams operating the shaft 540 clockwise (Fig. 9) and then counterclockwise for each sensing operation in order to lift and lower the sensing wires as illustrated in Figs. 4 and 5. Shortly thereafter, the sensing unit is given a horizontal movement as illustrated by the dotted line position in Fig. 5, and that movement is caused by the rocking of a bell crank 710 (Fig. 9) keyed to shaft 670 and carrying a pair of cam follower rollers 711 resting on the periphery of cams 703 and 704 (Fig. 11), said cams rocking shaft 670 first clockwise to straighten the sensing wires for the vertical lift and then counterclockwise to make contact and hold in position (while twelve spaced pulses are sent differentially through different shifted wires) before the sensing frame is again brought to the other horizontal position. As part of the initial cyclic motion, the frame is lowered slightly by the vertical parts controlled by cams 707 and 706, to depress the pins 699 in the lower lobe of the T slot 701 as shown in Fig. 9, and this serves to realign the sensing wires 671 by pushing their lower ends against a common bottom plane.

Keyed onto shaft 540 (Figs. 9 and 11) are two operating levers 713 which are spaced apart to coincide with the sides of the movable sensing frame and form an operating bail to adjust it vertically. A somewhat similar pair of levers 714 (Fig. 9) are keyed on shaft 670 and articulated to paired linkages to act as a bail to shift the sensing unit frame horizontally.

Referring to Fig. 9, the side rail 698 is connected by means of a stud 716 to a link 717 loosely attached to the lever 713 keyed to shaft 540. The right end of said lever 713 connects to a link 718 in turn connected to an arm 719 affixed to a short shaft 720 which passes through frame 683 (Fig. 10) and is loosely pivoted therein and carries on the inside another arm 721. The opposite end of said arm 721 carries by means of a stud 722 (Fig. 9) another link 723 further attached by means of a stud 724 to the right end of the rail 698. The parts of the foregoing description are duplicated with respect to the construction and operation of the other rail 698 carried on the opposite side of the unit. The rails are further adapted to be held in a slideable relationship with the side frames by means of the flanged pin extensions 700, the tenon portions of which pass through the openings 701 provided in the side frames and are held into threaded engagement with their associated rails 698 (Fig. 11) and the insulation carrier channel members 697.

The rails are guided for horizontal reciprocation by means of the following arrangement shown in Fig. 9. Here there is shown a pin 726 attached to the right rail 698 and confined for horizontal movement in a slot 727 provided in a T shaped arm 728 pivoting on a stud 729 extending inward from frame 683. The two upper ends of the T shaped member are appropriately connected to the upper ends of a pair of vertical links 730 and 731, both in turn connected to an arm 714 keyed to the shaft 670 journalled in the side frames of the bill feed. The foregoing is also duplicated with respect to parts for shifting the opposite rail 698.

Because of the double cam actuators 703, 704 and 706, 707 (Fig. 11), both sensing unit operating linkages for horizontal and vertical movement are positively driven in both directions, forward and back.

Referring to Fig. 9, the timing relationship between the shafts 540 and 670 is such that when shaft 540 is displaced angularly to raise the sensing unit, shaft 670 is accordingly stationary in order that the T member 728 may accurately guide the rails vertically by means of the pin and slot arrangement 726, 727. The shaft 670 becomes operative thereafter to shift the rails 698 to the right by means of the T members which are now displaced counterclockwise.

The purpose of the foregoing arrangement may be appreciated by referring back to Figs. 3, 4 and 5. In Fig. 3, for example, the sensing wires 671 are shown in the retracted inactive positions with respect to members 680 and 676, the latter being used for read-out pulses when touched. On the right, Fig. 5, the sensing wires (dotted lines) are shown in touching operative positions with respect to members 680 and 676.

In Figs. 3–7, there is shown a card BC presented to the sensing wires for a search thereof to determine the presence or absence of holes. It will be recalled that the wires are held by friction in the carrier plate and when an upward shift thereof is made in the manner described, the wires are adjusted accordingly; that is, those for which no holes are presented are shifted relative to the carrier and to those which find holes. After the set up operation, the carriers are shifted downwardly far enough to where the bottoms of the displaced sensing wires 671 (Fig. 7) move below the top of the vertical abutment 733 along one edge of bar 680. Immediately thereafter the carriers are shifted to the right, thereby bringing some unshifted wires into contact with bar 676, but the wires displaced by lack of a card hole are locked to the left by abutment 733 and do not make contact with 676. After all digital pulses are sent through contacting wires, the carriers are shifted horizontally to move the wires away from bar 676, and then the carriers are depressed vertically a slight amount to realign the sensing wires and prepare them for another upward excursion to sense card perforations.

The timing of the bill sensing devices may be studied by reference to the cams on shaft 498 as shown in Fig. 9. Since the reading of a bill card by the shifted wires is in a sense stored therein, after such wire sensing has been made and the wires lowered, the bill card is then free to be advanced further into the bill handling unit. Therefore, while digital pulses are being directed through the contacting wires, the related bill card is advanced and the next bill card is brought into the sensing unit. Late in each bill handling cycle the picker clutch magnet PCM (Fig. 2) is pulsed and the clutch is effective to operate the picker drive to start a bill card advancing from the magazine M to the sensing unit. At about the mid point of a cycle, the cam 542 (Fig. 9) allows the closing of the gate 535 to stop the incoming bill card in the sensing position and hold it there for about one quarter of a cycle during which time the sensing wires are raised and lowered. Directly thereafter the gate is lowered and the card is permitted to feed out of the sensing unit. During the third quarter of the cycle the cams 703 and 704 are effective to shift the sensing frame 698 so that the wires therein are straightened vertically and not pressed against the sensing bar 676 as shown in Fig. 5. It is at this time that the other cams 706 and 707 (Fig. 9) first lower the sensing frame to line up all the sensing wires 671 (Fig. 3) by abutting them against the bottom of groove 679. Then the frame is raised to lift all the wires and project some of them through bill card perforations wherever found. Shortly thereafter the frame is again lowered partway (Fig. 5) to the position wherein the frame is ready to be shifted to the right to bring some of the wire ends against contact bar 676 as shown in dotted lines, and that horizontal shift is brought about by the final dip in cam 703 and rise on cam 704 which control the horizontal shift of the sensing frame.

The cranks on shafts 540 and 670 (Fig. 9) are all keyed thereon to be operative in all axial positions. This adapts the sensing unit to be adjusted laterally across the bill feed unit so that the twenty positions or columns of sensing wires may be placed where desired with respect to main and stub fields of bill card sections to read out predetermined data.

When the larger size ledger cards LC are handled there is no difference in the mode of stopping and sensing the element. However, the tail end of a large card or sheet trails behind the sensing station and out of the range of control. At the piercing station the same relationship exists, with the forward edge of the ledger card stopped by a positive member and the rear end frictionally engaged for feeding at the proper time.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for sensing a perforation in a record, a wire, a holder for presenting said wire perpendicularly to the face of the record, said holder being formed with a plurality of slots in which said wire is threaded to be frictionally assembled on the holder, means for moving said holder toward and away from said record whereby the wire thereon is either moved relative thereto when the wire abuts against an imperforate position or movable therewith when the wire passes through the perforation, and contact means cooperating with said wire after its withdrawal from the record and establishing contact with that wire which has no relative movement with respect to the holder.

2. In a device for sensing a perforation in a record, an elongated flexible sensing member, a holder on which said member is held frictionally, means for moving said holder toward and away from the record whereby the member thereon is either moved along therewith through the perforation or moved relative to the holder when abutting against an imperforate record, a notched retainer for engaging the end of said member opposite the sensing end, said member being inserted in said notch when moved relative to the holder and after the holder is withdrawn from the record, means for producing relative movement of said retainer with respect to said holder whereby the member when engaged by the retainer is shifted out of a position that it would otherwise occupy, and an electrical contact means which is so positioned as to engage the member to establish a signal when the member is not in the retainer therefore indicating a member position indicative of a sensed perforation.

3. In a device for sensing perforations in a row of index positions on a record, a series of flexible sensing members, a holder formed with a series of longitudinal and lateral openings spaced in accordance with the spacing of the index points and holding said members threaded therein and frictionally held penpendicular to the face of the record, means for shifting said holder toward and away from the record to cause the ends of said sensing members to be shifted in abutting relation against the face of the record to sense perforations by passing through openings at one or more of the index point positions and when said sensing members encounter an imperforate position they are shifted relative to the holder, otherwise they remain in position thereon when passing through a perforation, means for shifting said holder at right angles to the sensing motion, a notched retainer in which the lower ends of the sensing member are engaged and held to prevent them following said lateral movement, a contact bar against which the lower ends of the unshifted members are brought into contact to establish circuits corresponding to all positions where record perforations have been sensed.

4. In a device for sensing perforations in a record element having columns and rows of index point positions wherein multi-ordered information is represented by perforations arranged in code, a number of sets of sensing wires corresponding in number and arrangement to the columns and rows of index points on the record and arranged perpendicular thereto, a holder formed with openings through which said wires are threaded to be in frictional contact therewith and held in said perpendicular relationship, means for shifting said holder up and down relative to the face of said record whereby the wires assembled thereon are either carried along through the perforations sensed or brought into abutment with the face of the record and shifted relative to the holder, a series of notched retainer members arranged in rows to engage brought down lower than the unshifted wires, means for moving the holder at right angles to the other movements the lower ends of wires shifted relative to the holder and after sensing the record whereby certain of the wire ends are held in the retainers and others are allowed to spring forward indicative of unshifted positions resulting from sensing record perforations, and a series of contact bars arranged in rows alongside said retainer bars and against which said free unshifted wire ends come into contact to establish signals representative of perforations sensed by the wires.

5. A device of the kind set forth in claim 4 further characterized by the provision of a magazine for holding a plurality of records, a picker mechanism for removing the records one at a time, a main operating mechanism, a clutch between said main operating mechanism and said picker mechanism for calling the latter into operation for each card sensing cycle, a record receiving station above said sets of sensing wires, a gate for limiting movement of said record and holding it in position to be sensed, means for operating said gate, a second clutch between said main operating mechanism and the means for shifting said holder, and means for operating said clutches in succession to feed, sense and release a record.

6. A device according to claim 4 wherein said holder is formed of a boxlike formation supported by an arrangement of parallel links, and said holder shifting means includes a series of bell cranks connected to said links, and cams for operating said cranks to lift and lower said holders.

References Cited in the file of this patent

UNITED STATES PATENTS 2,478,275   Johnson _____ Aug. 9, 1949

FOREIGN PATENTS 442,236   Germany _____ Mar. 26, 1927